(12) United States Patent
Imano et al.

(10) Patent No.: US 11,764,445 B2
(45) Date of Patent: Sep. 19, 2023

(54) BATTERY AND BATTERY PRODUCTION METHOD

(71) Applicant: TOYOTA JIDOSHA KABUSHIKI KAISHA, Toyota (JP)

(72) Inventors: Manabu Imano, Nagoya (JP); Yasumasa Oguma, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 437 days.

(21) Appl. No.: 17/171,142

(22) Filed: Feb. 9, 2021

(65) Prior Publication Data

US 2021/0305662 A1 Sep. 30, 2021

(30) Foreign Application Priority Data

Mar. 24, 2020 (JP) .................................. 2020-053264

(51) Int. Cl.
| | |
|---|---|
| *H01M 4/02* | (2006.01) |
| *H01M 50/528* | (2021.01) |
| *B23K 1/00* | (2006.01) |
| *H01M 10/0585* | (2010.01) |
| *H01M 50/593* | (2021.01) |
| *H01M 50/531* | (2021.01) |
| *B23K 101/36* | (2006.01) |

(52) U.S. Cl.
CPC ......... *H01M 50/528* (2021.01); *B23K 1/0016* (2013.01); *H01M 10/0585* (2013.01); *H01M 50/531* (2021.01); *H01M 50/593* (2021.01); *B23K 2101/36* (2018.08); *H01M 2004/021* (2013.01)

(58) Field of Classification Search
CPC ....................................................... H01M 4/04
See application file for complete search history.

(56) References Cited

U.S. PATENT DOCUMENTS

| | | |
|---|---|---|
| 2008/0138716 A1 | 6/2008 | Iwama et al. |
| 2015/0255827 A1 | 9/2015 | Matsushita et al. |
| 2019/0245210 A1 | 8/2019 | Matsushita |
| 2019/0334205 A1* | 10/2019 | Waseda ................. H01M 4/134 |

FOREIGN PATENT DOCUMENTS

| | | |
|---|---|---|
| JP | 2008146868 A | 6/2008 |
| JP | 2013168317 A | 8/2013 |
| JP | 2015167117 A | 9/2015 |
| JP | 2019135690 A | 8/2019 |
| JP | 2019192610 A | 10/2019 |

* cited by examiner

*Primary Examiner* — Jacob B Marks
(74) *Attorney, Agent, or Firm* — Dickinson Wright, PLLC

(57) ABSTRACT

The battery of the present disclosure comprises a plurality of electrode bodies, wherein one of the electrode bodies and another of the electrode bodies are connected via a conductive material, each of the electrode bodies includes a metal current collector, an active material layer, and an electrolyte layer, the metal current collector has a connection surface which contacts the conductive material and a laminate surface which contacts the active material layer, and a ten-point average roughness of the laminate surface is less than a ten-point average roughness of the connection surface. According to the battery of the present disclosure, both adhesion between the metal current collector and the active material layer in the electrode body and connectivity between the electrode bodies via the conductive material can be achieved.

15 Claims, 10 Drawing Sheets

CASE OF
ROUGHENED SURFACE

CASE OF
SMOOTH SURFACE

BATTERY AND BATTERY PRODUCTION METHOD

FIELD

The present disclosure relates to a battery and a battery production method.

BACKGROUND

Patent Literature 1 discloses a battery having a plurality of stack electrode bodies. In the battery disclosed in Patent Literature 1, a current collector extends from each electrode body, and the extending current collectors are connected to each other via a conductive material.

Patent Literature 2 discloses a laminate-type all-solid-state battery in which the side surfaces are coated with a resin. In the battery disclosed in Patent Literature 2, current collectors extend from the side surfaces of the battery, and adhesion between the current collectors and the resin is achieved by increasing the surface roughness of the current collectors in the extending parts.

Patent Literature 3 discloses a current collector used in an all-solid-state battery. In the current collector disclosed in Patent Literature 3, an aluminum oxide layer is provided on the surface of the current collector layer, and peeling of the aluminum oxide layer from the current collector layer is suppressed by increasing the surface roughness of the current collector layer.

CITATION LIST

Patent Literature

[PTL 1] Japanese Unexamined Patent Publication No. 2015-167117
[PTL 2] Japanese Unexamined Patent Publication No. 2019-192610
[PTL 3] Japanese Unexamined Patent Publication No. 2019-135690

SUMMARY

Technical Problem

According to new findings of the present inventors, in batteries in which a plurality of electrode bodies are connected via a conductive material, it may be difficult in some cases to achieve both adhesion between the current collectors and the active material layers in the electrode bodies and connectivity between the electrode bodies (current collectors) via the conductive material.

Solution to Problem

As one means for solving the above problem, the present disclosure provides:
a battery comprising a plurality of electrode bodies, wherein
one of the electrode bodies and another of the electrode bodies are connected via a conductive material,
each of the electrode bodies comprises a metal current collector, an active material layer, and an electrolyte layer,
the metal current collector has a connection surface which contacts the conductive material and a laminate surface which contacts the active material layer, and
a ten-point average roughness of the connection surface is less than a ten-point average roughness of the laminate surface.

In the battery of the present disclosure, the ten-point average roughness of the connection surface may be 1 μm or less.

In the battery of the present disclosure, the conductive material may include solder.

In the battery of the present disclosure, the metal current collector of one of the electrode bodies and the metal current collector of another of the electrode bodies, which are connected via the conductive material, may be composed of different materials.

In the battery of the present disclosure, the metal current collector may comprise a tab, and the tab may have the connection surface.

In the battery of the present disclosure, one of the electrode bodies and another of the electrode bodies may be connected in series via the conductive material.

In the battery of the present disclosure, an insulating body may be included in a part between one of the electrode bodies and another of the electrode bodies.

As one means for solving the above problem, the present disclosure provides:
a battery production method, comprising:
providing a laminate surface having a comparatively high ten-point average roughness and a connection surface having a comparatively low ten-point average roughness on a surface of a metal current collector,
laminating an active material layer on the laminate surface of the metal current collector,
using the metal current collector on which the active material layer is laminated to produce an electrode body,
preparing a plurality of the electrode bodies, and
connecting the connection surface of one of the electrode bodies and the connection surface of another of the electrode bodies via a conductive material.

The production method of the present disclosure may comprise:
subjecting the metal current collector to a roughening process to form the laminate surface having a ten-point average roughness of more than 1 μm on a part of the metal current collector.

The production method of the present disclosure may comprise:
subjecting the metal current collector to a smoothing process to form the connection surface having a ten-point average roughness of 1 μm or less on a part of the metal current collector.

The production method of the present disclosure may comprise:
using solder and flux as the conductive material,
decreasing an oxide film present on the connection surface by the flux, and
melting the solder to adhere it to the connection surface.

In the production method of the present disclosure, the metal current collector of one of the electrode bodies and the metal current collector of another of the electrode bodies, which are connected via the conductive material, may be composed of different materials.

The production method of the present disclosure may comprise:
providing a tab on a part of the metal current collector, and in this case, the tab may have the connection surface.

The production method of the present disclosure may comprise:

connecting one of the electrode bodies and another of the electrode bodies in series via the conductive material.

The production method of the present disclosure may comprise:

arranging an insulating body in a part between one of the electrode bodies and another of the electrode bodies.

Advantageous Effects of Invention

According to the battery of the present disclosure, both adhesion between the current collectors and the active material layers of the electrode bodies and connectivity between the electrode bodies via the conductive material are facilitated.

DESCRIPTION OF EMBODIMENTS

1. Battery

The battery of the present disclosure comprises a plurality of electrode bodies. In the battery of the present disclosure, one of the electrode bodies and another of the electrode bodies are connected via a conductive material. Each of the electrode bodies comprises a metal current collector, an active material layer, and an electrolyte layer. The metal current collector has a connection surface which contacts the conductive material and a laminate surface which contacts the active material layer. The ten-point average roughness of the connection surface is less than the ten-point average roughness of the laminate surface.

In the battery of the present disclosure, since the surface roughness of the laminate surface of the metal current collector is comparatively high, due to the anchor effect, the adhesion of the active material layer to the laminate surface can be maintained at a high level.

An oxide film inevitably forms on the surface of the metal current collector. According to new findings of the present inventors, when there are many oxide films on the surface of a metal current collector, the physical or electrical connectivity of a conductive material to the surface of the metal current collector deteriorates. For example, an oxide film may reduce the adhesion of a conductive material to the surface of a current collector. Alternatively, the oxide film on the surface of the current collector may increase the contact resistance between the current collector and the conductive material.

In the battery of the present disclosure, since the surface roughness of the connection surface of the metal current collector is comparatively low, the generation of an oxide film on the connection surface is suppressed, whereby decrease of the generated oxide film is facilitated. Thus, physical and electrical connection of the conductive material with the connection surface is facilitated.

As described above, according to the battery of the present disclosure, both adhesion between the current collectors and the active material layers of the electrode bodies and connectivity of the electrode bodies via the conductive material are facilitated. A structural example of the battery according to the present disclosure will be described below.

1.1 Metal Current Collector

Figure 1:
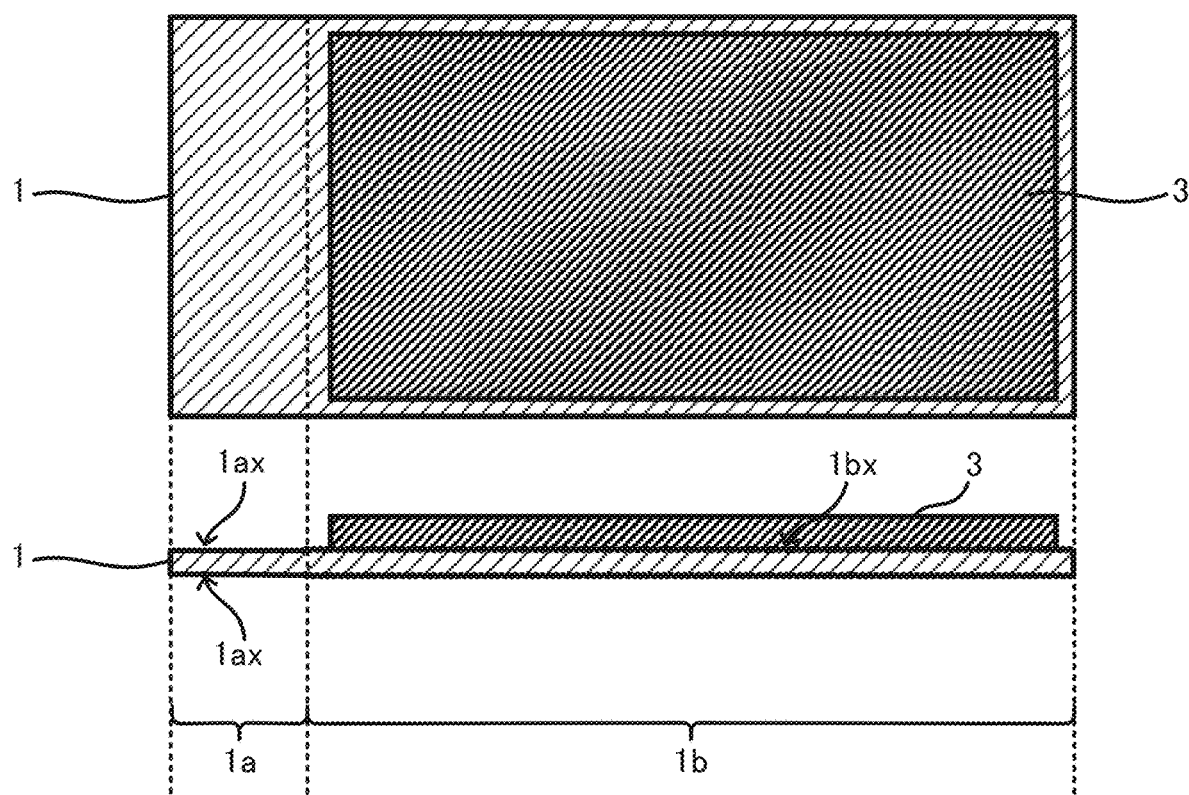
FIG. 1 is a schematic view detailing a connection surface and a laminate surface of a metal current collector. Examples of the planar shapes and side surface shapes of the metal current collector and the active material layer are shown.

In the battery of the present disclosure, a metal current collector having an adjusted surface roughness is used. As shown in FIG. 1, the metal current collector 1 used in the battery of the present disclosure comprises a connection part 1a and a laminate part 1b. The connection part 1a has a connection surface 1ax (the connection surface 1ax to which the conductive material is connected) which contacts the conductive material (not illustrated in FIG. 1), and the laminate part 1b has a laminate surface 1bx (the laminate surface 1bx on which the active material layer 3 is laminated) which contacts the active material layer 3. In the metal current collector 1, the ten-point average roughness of the connection surface 1ax is less than the ten-point average roughness of the laminate surface 1bx. As a result, both adhesion between the metal current collector 1 and the active material layer 3 and connectivity between the metal current collector 1 and the conductive material are facilitated.

Though, in the metal current collector 1 shown in FIG. 1, connection surfaces 1ax are provided on the front and back of the metal current collector 1, and the laminate surface 1bx is provided on only one surface of the metal current collector 1, the form of the metal current collector 1 is not limited thereto. The connection surface 1ax may be provided on only one surface of the metal current collector, in accordance with the shape of the battery, or may be provided on the front and back of the metal current collector 1. Furthermore, the laminate surface 1bx may be provided on only one surface of the metal current collector 1, depending on the shape of the battery, or may be provided on the front and back of the metal current collector 1. Further, the laminate surface 1bx may be provided on the front and back of the metal current collector 1 on the same side as the connection surface 1ax, or may be provided on the surface on the side opposite the connection surface 1ax.

It is sufficient that the metal current collector 1 comprise at least a connection surface 1ax and a laminate surface 1bx, and it may comprise surfaces other than these. For example, a gap may be provided between the connection surface 1ax and the laminate surface 1bx.

The metal current collector 1 is composed of a metal which is generally used as the current collector for batteries. Regardless of the kind of the metal, the oxide film problems described above may occur. Examples of the metal constituting the metal current collector 1 may include at least one metal selected from the group consisting of Cu, Ni, Cr, Au, Pt, Ag, Al, Fe, Ti, Zn, Co, and stainless steel. In consideration of versatility and effect, the metal current collector 1 may contain at least one metal selected from the group consisting of Ni, Fe, Cu and Al, and may contain Ni.

The metal current collector 1 may be constituted by a metal foil or metal plate. When the metal current collector 1 is a metal foil, the volumetric energy density of the battery is further improved. The thickness of the metal current collector 1 is not particularly limited. For example, it may be 0.1 µm or more, or 1 µm or more, or may be 1 mm or less, or 100 µm or less.

The ten-point average roughness of the connection surface 1ax of the metal current collector 1 is less than the ten-point average roughness of the laminate surface 1bx. The ten-point average roughness of the connection surface 1ax may be, for example, 1 µm or less, may be 0.8 or less, or may be 0.5 µm or less. Furthermore, the ten-point average roughness of the laminate surface 1bx may be, for example, greater than 1 µm, may be 1.2 µm or more, or may be 1.5 µm or more.

The ten-point average roughness (Rz) of the metal current collector is determined in accordance with JIS B0601:1994 using an SE-600 manufactured by Kosaka Laboratory Co., Ltd., by cutting a metal current collector to a size of 10 mm×10 mm, under the measurement conditions of a measurement length of 8 mm and a cutoff value of 0.5 mm.

As will be described later, the metal current collector may comprise a tab as the connection part 1a, and the tab may have the connection surface 1ax. In the metal current collector 1, the material of the tab may be the same as the material of another member, or may be different. The thickness of the tab may be the same as the thickness of another member, or may be different. It is sufficient that the tab have a shape protruding from a portion other than the tab in the metal current collector 1. As the protruding shape of the tab, various shapes such as a polygonal shape, a semicircular shape, and a linear shape can be adopted. The method of providing the tab in the metal current collector 1 is not particularly limited. For example, the tab may be formed by cutting out a part of the metal current collector 1, or the tab may be bonded with a portion of the metal current collector 1 other than the tab by welding or the like.

The method for adjusting the surface roughness of the metal current collector 1 is not particularly limited. The metal current collector 1 may be subjected to a roughening process to form a laminate surface having a high ten-point average roughness on a part of the metal current collector 1. Example of the roughening process include machining, etching, plating, and laser processing. When the metal current collector is subjected to a roughening process, the portion which becomes the connection surface 1ax may be masked. Alternatively, the metal current collector may be subjected to a smoothing process to form a connection surface having a low ten-point average roughness on a part of the metal current collector. Examples of smoothing processes include mechanical polishing, electrolytic polishing, and laser processing.

1.2 Electrode Body

Figure 2A:
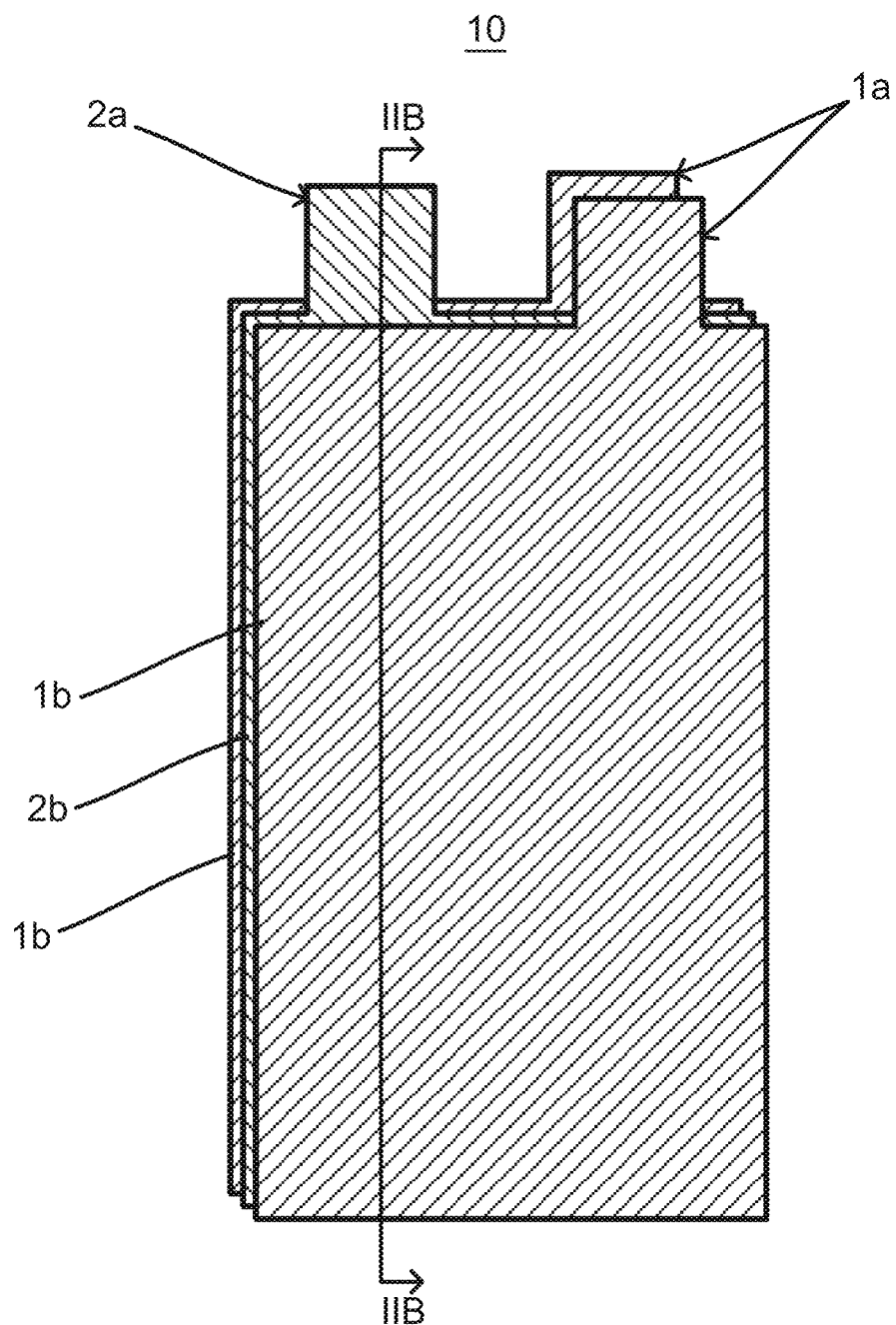
FIG. 2A is a schematic view detailing an example of the structure of an electrode body. The appearance of the electrode body is shown.

In the battery of the present disclosure, an electrode body having the metal current collector described above is used. As shown in FIGS. 2A and B, the electrode body 10 may comprise metal current collectors 1, 2, active material layers 3, 4, and an electrolyte layer 5. The electrode body 10 may comprise, in addition to the metal current collectors 1, 2, the active material layers 3, 4, and the electrolyte layer 5, some sort of surface layer or intermediate layer.

1.2.1 Metal Current Collector

The metal current collector 1 is as described above. A metal current collector 2 is the opposite of the metal current collector 1. When the metal current collector 1 is a positive electrode current collector, the metal current collector 2 is a negative electrode current collector, and when the metal current collector 1 is a negative electrode current collector, the metal current collector 2 is a positive electrode current collector. The metal current collector 2 may have the same shape as the metal current collector 1 or may have a different shape.

Figure 2B:
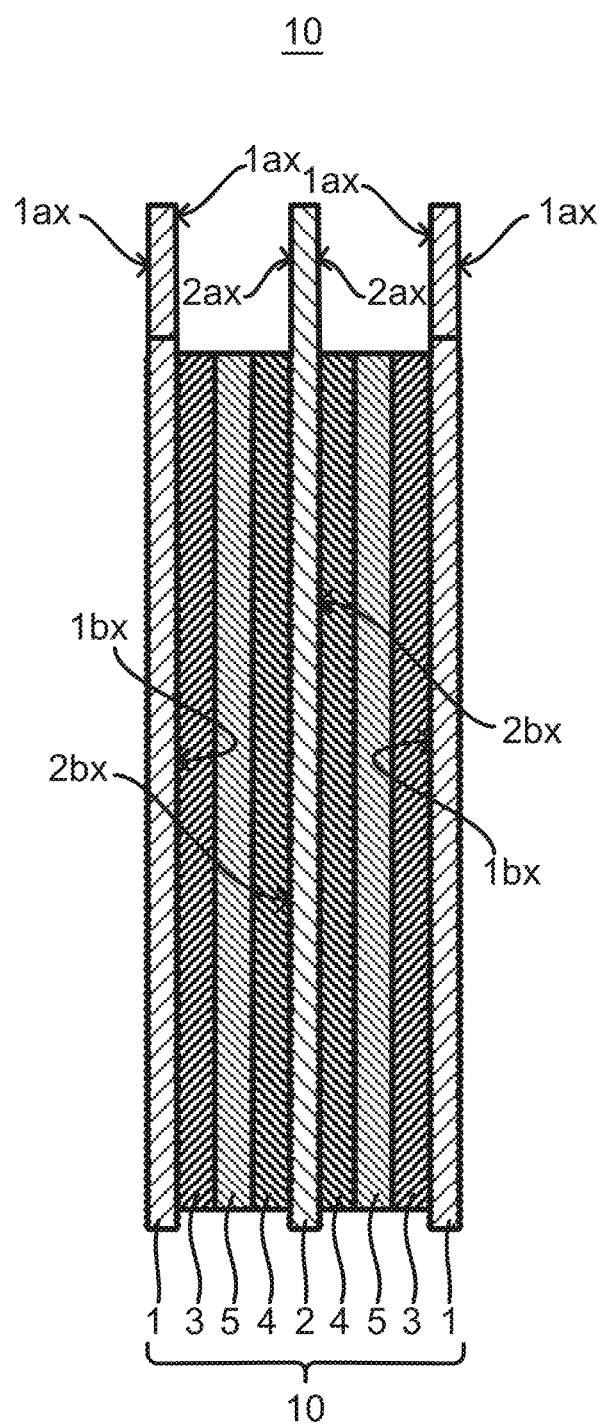
FIG. 2B is a schematic view detailing an example of the structure of an electrode body. The structure of the cross-section along arrow IIB-IIB in FIG. 2A is shown.

As shown in FIG. 2A, the metal current collector 2 may comprise a connection part 2a and a laminate part 2b. As shown in FIG. 2B, the connection part 2a has a connection surface 2ax to which the conductive material (not illustrated in FIG. 2B) is connected, and a laminate surface 2bx on which the active material layer 4 is laminated. In the metal current collector 2, the ten-point average roughness of the connection surface 2ax may be less than the ten-point average roughness of the laminate surface 2bx. As a result, both adhesion between the metal current collector 2 and the active material layer 4 and connectivity between the metal current collector 2 and the conductive material are facilitated.

Though FIG. 2B illustrates an aspect in which the connection surface 2ax and the laminate surface 2bx are each provided on the front and back of the metal current collector 2, the form of the metal current collector 2 is not limited thereto. The connection surface 2ax may be provided on only one surface of the metal current collector 2, depending on the shape of the battery, or may be provided on the front and back of the metal current collector 2. Furthermore, the laminate surface 2bx may be provided on only one surface of the metal current collector 2, depending on the shape of the battery, or may be provided on the front and back of the metal current collector 2. Further, the laminate surface 2bx may be provided on the surface on the same side as the connection surface 2ax, among the front and back surfaces of the metal current collector 2, or may be provided on the opposite side surface as the connection surface 2ax. The metal current collector 2 may have surfaces other than the connection surface 2ax and the laminate surface 2bx. For example, a gap may be provided between the connection surface 2ax and the laminate surface 2bx.

The metal current collector 2 is composed of a metal which is generally used as the current collector for batteries. Examples of the metal constituting the metal current collector 2 may include at least one metal selected from the group consisting of Cu, Ni, Cr, Au, Pt, Ag, Al, Fe, Ti, Zn, Co, and stainless steel. Considering versatility and effect, the metal current collector 2 may contain at least one metal selected from the group consisting of Ni, Fe, Cu and Al. The metal current collector 2 may be composed of the same material as the metal current collector 1 or may be composed of a different material. It is easier to improve the battery performance when the metal current collector 1 and the metal current collector 2 are composed of different materials. When the metal current collector 1 and the metal current collector 2 are composed of different materials, one of the metal current collector 1 and the metal current collector 2 may contain Ni, and the other may contain Al. Alternatively, among the metal current collector 1 and the metal current collector 2, the one serving as the negative electrode current collector may contain Ni, and the one serving as the positive electrode current collector may contain Al.

The metal current collector 2 may be constituted by a metal foil or a metal plate. When the metal current collector 2 is a metal foil, the volumetric energy density of the battery is further improved. The thickness of the metal current collector 2 is not particularly limited. For example, it may be 0.1 μm or more, or may be 1 μm or more, and may be 1 mm or less, or may be 100 or less.

The ten-point average roughness of the connection surface 2$ax$ of the metal current collector 2 may be less than the ten-point average roughness of the laminate surface 2$bx$. The ten-point average roughness of the connection surface 2$ax$ may be, for example, 1 μm or less, may be 0.8 μm or less, or may be 0.5 μm or less. Furthermore, the ten-point average roughness of the laminate surface 2$bx$ may be, for example, greater than 1 μm, may be 1.2 μm or more, or may be 1.5 μm or more.

As shown in FIG. 2A, the metal current collector 2 may comprise a tab as the connection part 2$a$, and the tab may have the connection surface 2$ax$. In the metal current collector 2, the material of the tab may be the same as the material of another member, or may be different. The thickness of the tab may be the same as the thickness of another member, or may be different. It is sufficient that the tab have a shape which protrudes from a portion of the metal current collector 2 other than the tab. As the protruding shape of the tab, various shapes such as a polygonal shape, a semicircular shape, and a linear shape can be adopted. The method of providing tab in the metal current collector 2 is not particularly limited. For example, the tab may be formed by cutting out a part of the metal current collector 2, or the tab may be bonded with a portion of the metal current collector 2 other than the tab by welding or the like.

1.2.2 Active Material Layer

As shown in FIG. 2B, the laminate surface 1$bx$ of the metal current collector 1 contacts the active material layer 3 and the laminate surface 2$bx$ of the metal current collector 2 contacts the active material layer 4. The active material layer 3 may be a positive electrode active material layer or may be a negative electrode active material layer. When the active material layer 3 is a positive electrode active material layer, the active material layer 4 is a negative electrode active material layer, and when the active material layer 3 is a negative electrode active material layer, the active material layer 4 is a positive electrode active material layer.

The positive electrode active material layer is a layer containing at least a positive electrode active material. When constituting a solid-state battery, in addition to a positive electrode active material, a solid electrolyte, binder, and conductive aid can further be optionally contained. Furthermore, when constituting a liquid electrolyte-based battery, in addition to a positive electrode active material, a binder and conductive aid can further be optionally contained. A known active material may be used as the positive electrode active material. Among known active materials, two materials having different potentials (charge/discharge potentials) for occluding and releasing predetermined ions can be selected, and the material exhibiting a higher potential can be used as the positive electrode active material, and the material exhibiting a lower potential can be used as a negative electrode active material, which is described later. For example, when constituting a lithium ion battery, various lithium-containing composite oxides such as lithium cobalt oxide, lithium nickel oxide, $LiNi_{1/3}Co_{1/3}Mn_{1/3}O_2$, lithium manganate, and spinel-based lithium compounds can be used as the positive electrode active material. When constituting a solid-state battery, the surface of the positive electrode active material may be coated with an oxide layer such as a lithium niobate layer, a lithium titanate layer, or a lithium phosphate layer. Furthermore, when constituting a solid-state battery, the solid electrolyte is preferably an inorganic solid electrolyte. This is because the ionic conductivity thereof is higher than that of organic polymer electrolytes. This is also because it has excellent heat resistance as compared with organic polymer electrolytes. Furthermore, it is harder and more rigid than organic polymer electrolytes, whereby a battery can be more easily constructed. Preferable examples of inorganic solid electrolytes include: oxide solid electrolytes such as lithium lanthanum zirconate, LiPON, $Li_{1+x}Al_xGe_{2-x}(PO_4)_3$, Li—SiO-based glasses, and Li—Al—S—O-based glasses; and sulfide solid electrolytes such as $Li_2S$—$P_2S_5$, $Li_2S$—$SiS_2$, LiI—$Li_2S$—$SiS_2$, LiI—$Si_2S$—$P_2S_5$, $Li_2S$—$P_2S_5$—LiI—LiBr, LiI—$Li_2S$—$P_2S_5$, LiI—$Li_2S$—$P_2O_5$, LiI—$Li_3PO_4$—$P_2S_5$, and $Li_2S$—$P_2S_5$—$GeS_2$. In particular, sulfide solid electrolytes are preferable, and a sulfide solid electrolyte containing $Li_2S$—$P_2S_5$ is more preferable. Examples of the binder contained in the positive electrode active material layer include butadiene rubber (BR)-based binders, butylene rubber (IIR)-based binders, acrylate butadiene rubber (ABR)-based binders, polyvinylidene fluoride (PVdF)-based binders, and polytetrafluoroethylene (PTFE)-based binders. Examples of the conductive aid contained in the positive electrode active material layer include carbon materials such as Acetylene Black and Ketjen Black, and metal materials such as nickel, aluminum, and stainless steel. The contents of each of the components in the positive electrode active material may be the same as in the prior art. The shape of the positive electrode active material layer may be the same as in the prior art. In particular, from the viewpoint of easy construction of batteries, a sheet-like positive electrode active material layer is preferable. The thickness of the positive electrode active material layer is not particularly limited. It may be, for example, 0.1 μm to 2 mm. The lower limit thereof may be 1 μm or more and the upper limit thereof may be 1 mm or less.

The negative electrode active material layer is a layer including at least a negative electrode active material. When constituting a solid-state battery, in addition a negative electrode active material, a solid electrolyte, binder, and conductive aid can further be optionally contained. Furthermore, when constituting a liquid electrolyte-based battery, in addition to a negative electrode active material, a binder and conductive aid can further be optionally contained. A known active material may be used as the negative electrode active material. For example, when constituting a lithium ion battery, silicon-based active materials such as Si, Si alloys and silicon oxide; carbon-based active materials such as graphite and hard carbon; various oxide-based active materials such as lithium titanate; and metallic lithium and lithium alloys can be used as the negative electrode active material. The solid electrolyte, binder and conductive aid can be appropriately selected and used from those exemplified for the positive electrode active material layer. The contents of each of the components in the negative electrode active material may be the same as in the prior art. The shape of the negative electrode active material layer may be the same as in the prior art. In particular, from the viewpoint of easy construction of batteries, a sheet-like negative electrode active material layer is preferable. The thickness of the negative electrode active material layer is not particularly limited. It may be, for example, 0.1 μm to 2 mm. The lower limit thereof may be 1 μm or more and the upper limit thereof may be 1 mm or less.

1.2.3 Electrolyte Layer

The electrolyte layer 5 is a layer including at least an electrolyte. When constituting a solid-state battery, the electrolyte layer 5 can be a solid-state electrolyte layer containing a solid electrolyte and optionally a binder. As the solid electrolyte, the above-mentioned inorganic solid electrolyte, and in particular, a sulfide solid electrolyte is preferable. As the binder, the same binder as that used for the positive electrode active material layer can be appropriately selected and used. The content of each component in the solid electrolyte layer may be the same as in the prior art. The shape of the solid electrolyte layer may be the same as in the prior art. In particular, from the viewpoint easy construction of batteries, a sheet-like solid electrolyte layer is preferable. In this case, the thickness of the solid electrolyte layer may be, for example, 0.1 μm to 2 mm. The lower limit thereof may be 1 μm or more, and the upper limit may be 1 mm or less. Conversely, when constituting a liquid electrolyte-based battery, the electrolyte layer may contain a liquid electrolyte and a separator. A known liquid electrolyte and separator may be used. Note that when the case in which the electrolyte layer 5 is a liquid electrolyte layer and the case in which it is a solid electrolyte layer are compared, battery construction is considered easier in the case in which the electrolyte layer 5 is a solid electrolyte layer.

1.2.4 Other

The electrode body 10 can be produced by a known method. For example, the electrode body 10 can be produced by laminating the active material layer 3 on the laminate surface 1bx on one side of the metal current collector 1 by a dry method or a wet method, laminating the electrolyte layer 5 on one side of the active material layer 3 by a dry method or a wet method, laminating the active material layer 4 on one side of the electrolyte layer 5 by a dry method or a wet method, further laminating the surface 2bx of the metal current collector 2 on one side of the active material layer 4, and optionally pressing. The order of lamination of each layer is not limited to this order. In the technology of the present disclosure, since the surface roughnesses of the laminate surfaces 1bx, 2bx of the metal current collectors 1, 2 are high, when producing the electrode body 10, due to the anchor effect, the active material layers 3, 4 can be firmly adhered to the laminate surfaces 1bx, 2bx.

Note that though FIGS. 2A and B illustrate an aspect in which active material layers 4, 4 are provided on both sides of one metal current collector 2, electrolyte layers 5, 5 are provided on each active material layer 4, 4, active material layers 3, 3 are provided in each of the electrolyte layers 5, 5, and metal current collectors 1, 1 are provided in each of the active material layers 3, 3, the aspect of the electrode body is not limited thereto. The electrode body may be constructed by providing active material layers 3, 3, electrolyte layers 5, 5, active material layers 4, 4, and meta current collectors 2, 2 on both surface of one metal current collector 1, or the electrode body may be constructed by providing an active material layer 3, an electrolyte layer 5, and an active material layer 4 between one metal current collector 1 and one metal current collector 2. Alternatively, a bipolar electrode body may be constructed by providing a bipolar current collector between a metal current collector 1 and a metal current collector 2.

1.3 Electrode Body Interconnection (First Aspect)

Figure 3:
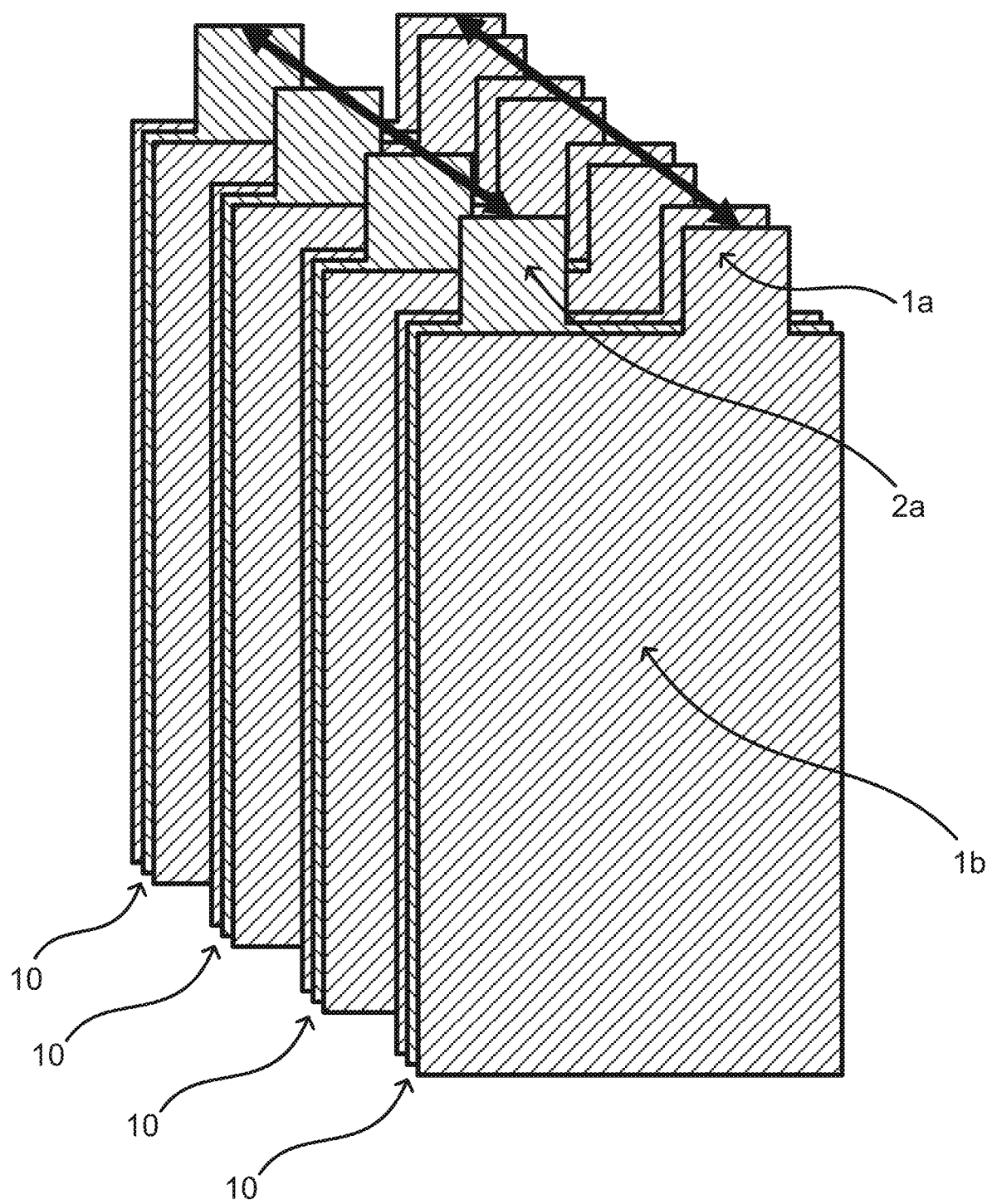
FIG. 3 is a schematic view detailing the structure of a battery according to a first embodiment. Connection is established in the thick arrow portion via a conductive material.
Figure 4:
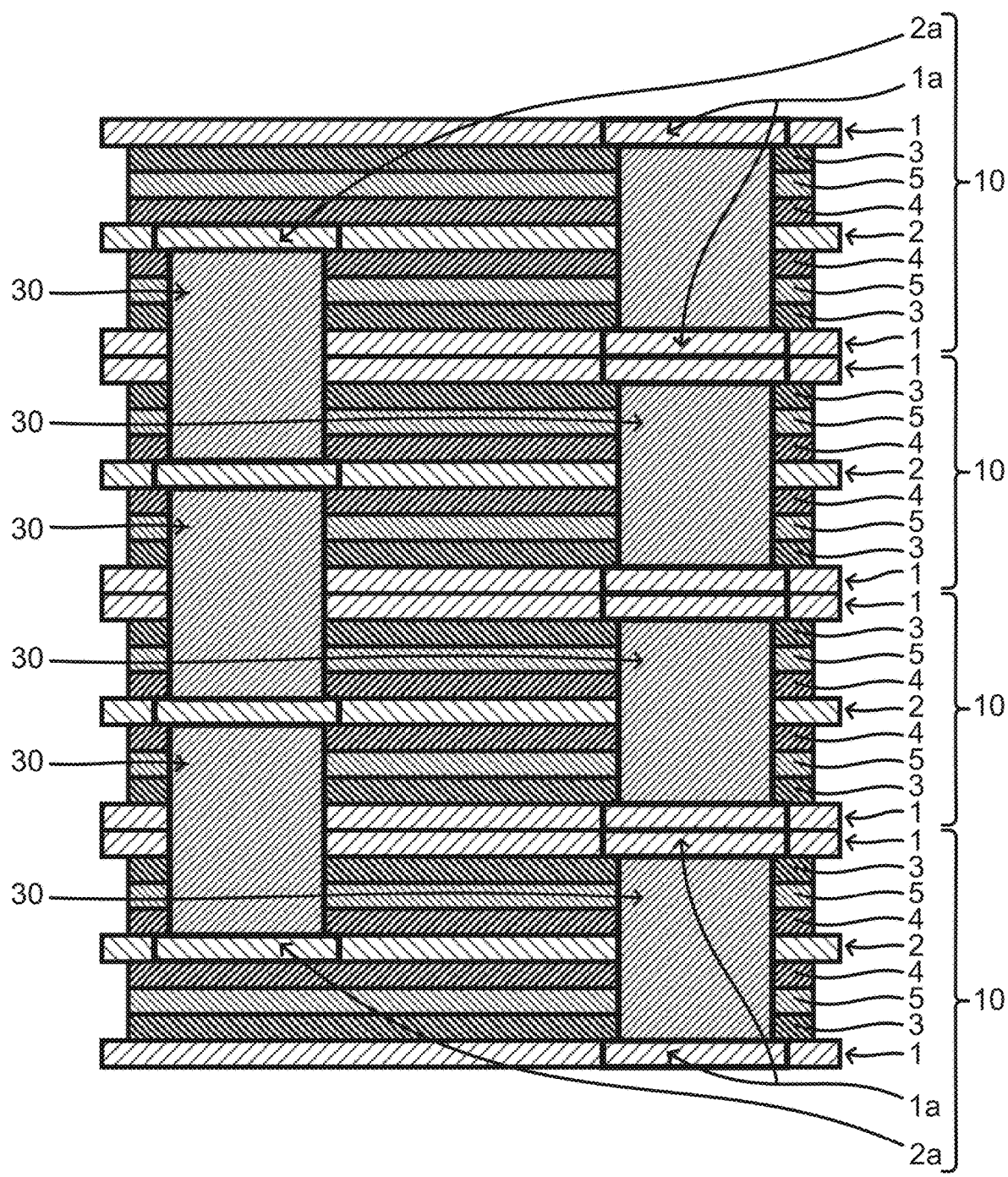
FIG. 4 is a schematic view detailing the structure of the battery according to the first embodiment.

The battery of the present disclosure includes a plurality of electrode bodies 10, as described above. One electrode body 10 and another electrode body 10 are connected via a conductive material. FIGS. 3 and 4 show a battery 100 according to the first aspect. As shown in FIG. 3, in the battery 100, the connection parts 1a of the plurality of electrode bodies 10 may be connected to each other and the connection parts 2a of the plurality of electrode bodies 10 may be connected to each other. In other words, one electrode body 10 and another electrode body 10 may be electrically connected in parallel via a conductive material. In this case, as shown in FIGS. 3 and 4, a plurality of electrode bodies 10 may be laminated so that the front and back sides of the electrodes face in the same direction.

As shown in FIG. 4, in the battery 100 according to the first aspect, the conductive materials 30 are used to connect the connection parts 1a together and the connection parts 2a together. The conductive materials 30 can also function as an adhesive agent for adhering the connection parts with each other.

1.3.1 Conductive Material

The conductive material 30 is composed of a material which is connected to the connection parts 1a, 2a and can facilitate conduction between the connection parts 1a, 2a. Examples of such a conductive material 30 include: a melt-bonding type metal-based adhesives containing a low melting point metal, such as solder; a conductive adhesive in which metal particles or carbon materials are dispersed in a thermosetting resin; and conductive tapes such as carbon tapes. Alternatively, the connection parts 1a, 2a may be connected to each other by interposing the connection parts 1a, 2a with a conductive interposing member.

In the battery 100 of the present disclosure, the surface roughnesses of the connection surfaces 1ax, 2ax of the metal current collectors 1, 2 are less than the surface roughnesses of the laminate surfaces 1bx, 2bx, and thus, the specific surface areas of the connection surfaces 1ax, 2ax are small, whereby the amount of oxide film formed on the connection surfaces 1ax, 2ax can be suppressed, and the formed oxide film can be easily decreased. Thus, when the conductive material 30 is connected to the connection surfaces 1ax, 2ax, contact resistance between the connection surfaces 1ax, 2ax and the conductive material 30 can be decreased. In other words, electrical connectivity between one electrode body 10 and another electrode body 10 is improved.

In the battery 100 of the present disclosure, a particularly high effect is exhibited when a melt-bonding type metal-based adhesive containing a low-melting point metal, such as solder, is used as the conductive material 30. As described above, in the battery 100 of the present disclosure, the amount of oxide film formed on the connection surfaces 1ax, 2ax can be suppressed, and the formed oxide film can be easily decreased. According to the new findings of the present inventors, on the connection surfaces 1ax, 2ax, which have a small amount of oxide film, the wettability of the metal-based adhesive agent is significantly improved. That is, the metal-based adhesive agent can firmly adhere the connection surfaces 1ax, 2ax, whereby the connectivity between one electrode body 10 and another electrode body 10 is remarkably improved.

Figure 5:
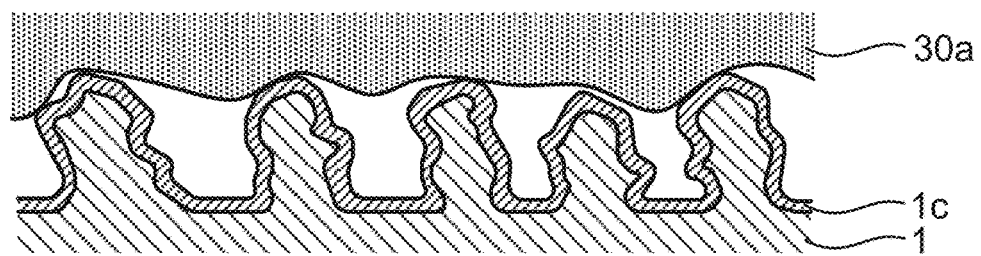
FIG. 5 is a schematic view detailing the removability of an oxide film on the current collector surface.

Note that when the connection parts 1a, 2a are connected to each other by solder, flux may be used along with the solder. In other words, the conductive material 30 may include solder or may include solder and flux-derived components. The flux can decrease or remove the oxide film of connection surfaces $1ax$, $2ax$. Any known flux may be used, the flux may be any of a resin-based flux, an organic acid-based flux, or an inorganic acid-based flux. According to the new findings of the present inventors, when the surface roughnesses of the connection surfaces $1ax$, $2ax$ are high, the amount of oxide film present on the connection surfaces $1ax$, $2ax$ is increased, and as shown in FIG. 5, gaps are likely to form between the flux $30a$ and the oxide film $1c$, whereby it becomes difficult to sufficiently remove the oxide film $1c$ from the surfaces of the connection surfaces $1ax$, $2ax$. Thus, when the solder is melted and attached to the connection surfaces $1ax$, $2ax$, the wettability of the solder may be poor, whereby it may be difficult to firmly adhere the solder to the connection surfaces $1ax$, $2ax$. In this regard, in the battery of the present disclosure, as described above, since the surface roughnesses of the connection surfaces $1ax$, $2ax$ are low, the effect of removing the oxide film with the flux is high, whereby the solder can firmly adhere to the connection surfaces $1ax$, $2ax$.

The metal current collectors 1, 2 of one electrode body 10 and the metal current collectors 1, 2 of another electrode body 10, which are connected via the conductive material 30, may be composed of the same material or may be composed of different materials. When the metal current collectors 1, 2 of one electrode body and the metal current collectors 1, 2 of another electrode body, which are connected via the conductive material 30, are composed of different materials, by using solder as the conductive material 30, the different metals can be more strongly and easily bonded together.

1.3.2 Insulating Body

As shown in FIG. 4, when electrode bodies 10 are connected by the conductive material 30, the electrode bodies 10 may be stacked. When stacking the electrode bodies 10, as shown in FIG. 4, they may be stacked in direct contact with each other or they may be stacked while some sort of intermediate member is interposed between the electrode bodies 10. For example, the battery 100 may have an insulating body in a part between one electrode body 10 and another electrode body 10. Note that when an insulating body is present between one electrode body 10 and another electrode body 10, it may be difficult to directly contact one electrode body 10 and another electrode body 10 by welding. In this regard, in the battery 100 of the present disclosure, since one electrode body 10 and another electrode body 10 are connected via the conductive material, even if an insulating body is present between electrode bodies 10, the electrode bodies 10 can be easily connected to each other.

Figure 6:
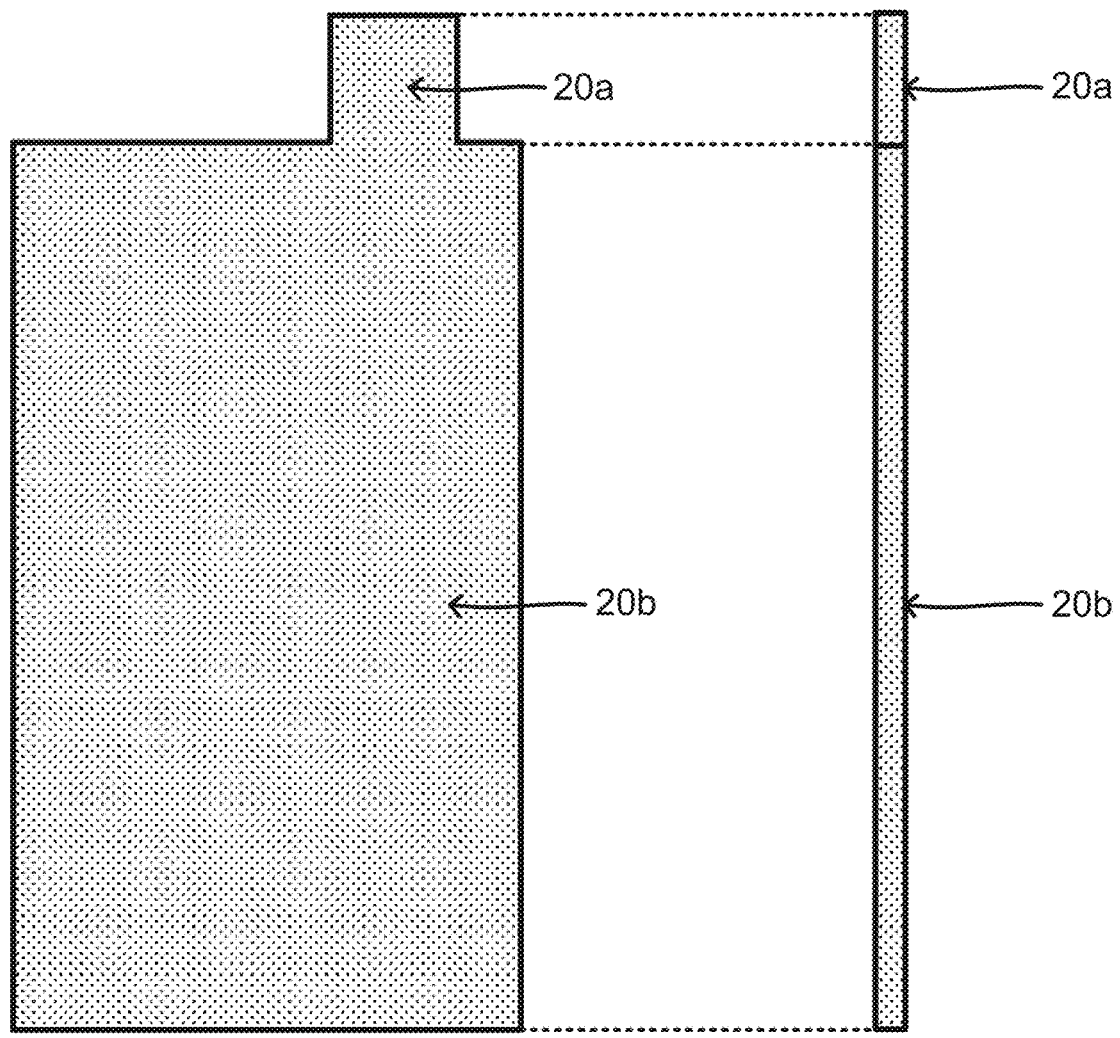
FIG. 6 is a schematic view detailing an example of the structure of an insulating body. Examples of the planar shape and side surface shape of the insulating body are shown.

It is sufficient that the insulating body be capable of insulating the electrode bodies 10 from each other, and the shape thereof is not particularly limited. For example, as shown in FIG. 6, the insulating body 20 may have an insulating tab $20a$ and an electrode insulating part $20b$.

The insulating tab $20a$ is arranged between the connection parts $1a$ of the electrode bodies 10 (for example, between the tabs) to prevent conduction between the connection parts $1a$. The insulating tab $20a$ may be composed of a resin such as polyethylene terephthalate, polyimide, or a silicone resin. Alternatively, the insulating tab $20a$ may be composed of a ceramic such as alumina. It is sufficient that the insulating tab $20a$ protrude from the electrode insulating part $20b$, and the protruding shape thereof may be any of various shapes such as a polygonal shape and a semicircular shape. The shape of the insulating tab $20a$ may correspond to the connection parts $1a$ so as to prevent conduction between the connection parts $1a$ of the electrode bodies 10. Furthermore, the insulating tab $20a$ may have a larger area than the connection parts $1a$. The thickness of the insulating tab $20a$ may be, for example, 0.1 μm to 2 mm. The thickness of the insulating tab $20a$ may be the same as or different from the thickness of the electrode insulating part $20b$. The thickness of the insulating tab $20a$ may be less than or equal to the thickness of the electrode insulating part $20b$.

The electrode insulating part $20b$ is arranged between one electrode body 10 and another electrode body 10 at a portion (electrode portion) where the active material layers 3, 4 are stacked in the stacking direction. For example, the laminate parts $1b$, $2b$ of the metal current collectors 1, 2 are insulated from each other by the electrode insulating part $20b$. A restraining pressure may be exerted on the electrode portions of the electrode bodies 10, and in this case, it is necessary that the electrode insulating part $20b$ not be damaged even when a high load is applied. Further, in consideration of suppressing heat transfer between the electrode bodies 10, the electrode insulating part $20b$ may be composed of a material having a high thermal resistance. The electrode insulating part $20b$ may be composed of a resin such as polyethylene terephthalate, polyimide, or a silicone resin. Alternatively, the electrode insulating part $20b$ may be composed of a ceramic such as alumina. The insulating tab $20a$ and the electrode insulating part $20b$ may be composed of the same material or different materials.

The shape of the electrode insulating part $20b$ can be, for example, a sheet-like shape. The thickness of the electrode insulating part $20b$ is not particularly limited as long as it is capable of preventing contact and conduction between the electrode bodies 10. For example, the thickness of the electrode insulating part $20b$ may be 0.1 μm to 2 mm.

The insulating body 20 can be produced by a known means and method. For example, the insulating body 20 can be obtained by molding a resin or ceramic into a film. Alternatively, the insulating body 20 may be produced by molding the electrode insulating part $20b$ and then adhering or welding the insulating tab $20a$ thereto.

Note that though an aspect in which the insulating body 20 includes the insulating tab $20a$ is illustrated in FIG. 6, the insulating body 20 may not include the insulating tab $20a$. However, when the electrode bodies 10 have tabs as the connection part $1a$, the insulating body 20 has the insulating tab $20a$ at a position corresponding to the tabs of the electrode bodies 10, whereby the tabs of the electrode bodies 10 are more easily insulated from each other.

1.3.3 Other

In the battery 100, the number of electrode bodies 10 is not particular limited. The number of electrode bodies 10 may be appropriately determined in accordance with the target battery performance.

In addition to the structures described above, the battery 100 may comprise necessary terminals and a battery exterior body, such as laminated film. The structures thereof are obvious.

1.4 Electrode Body Interconnection (Second Aspect)

Figure 7:
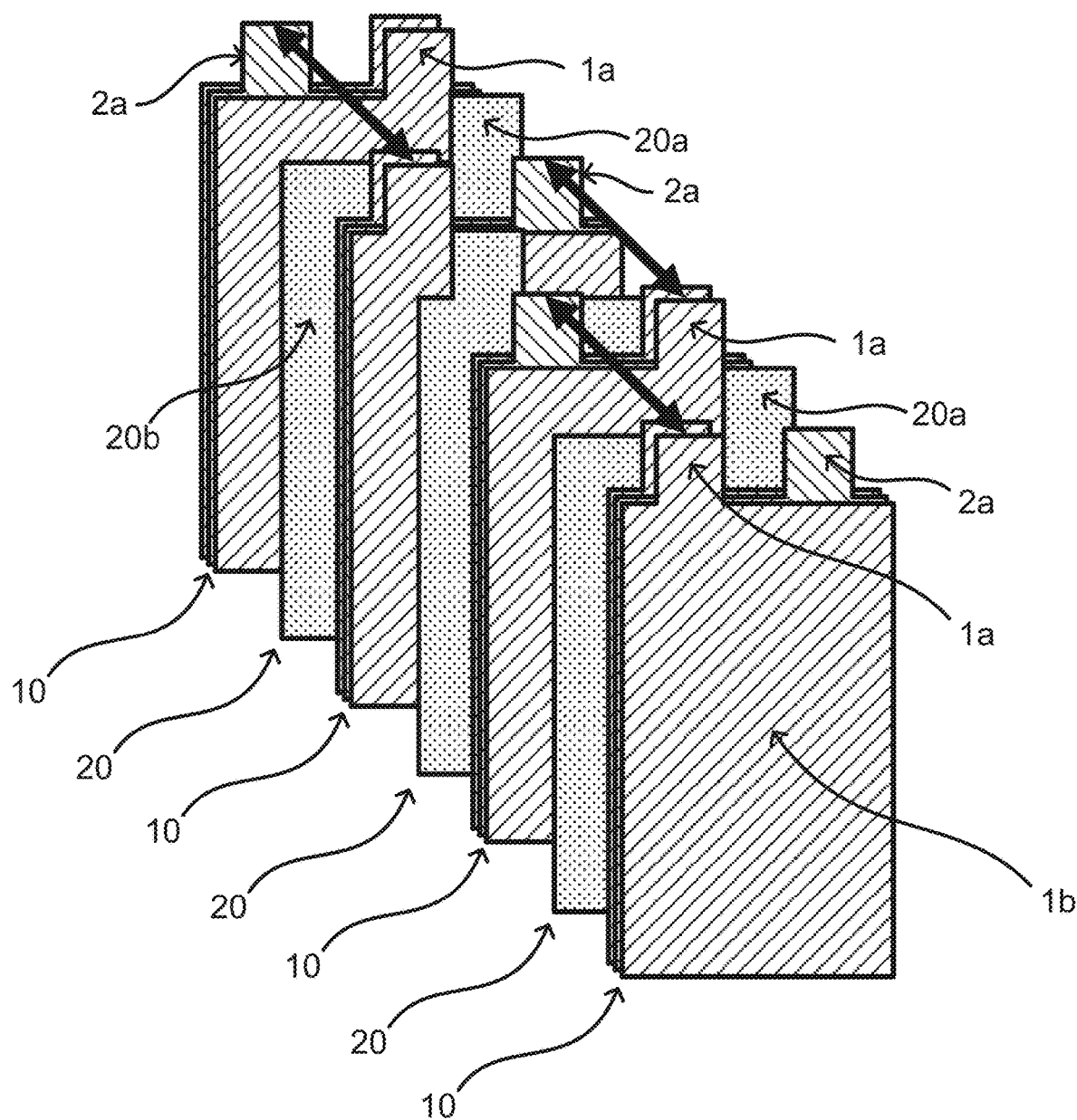
FIG. 7 is a schematic view detailing the structure of a battery according to a second embodiment. Connection is established in the thick arrow portion via a conductive material.
Figure 8:
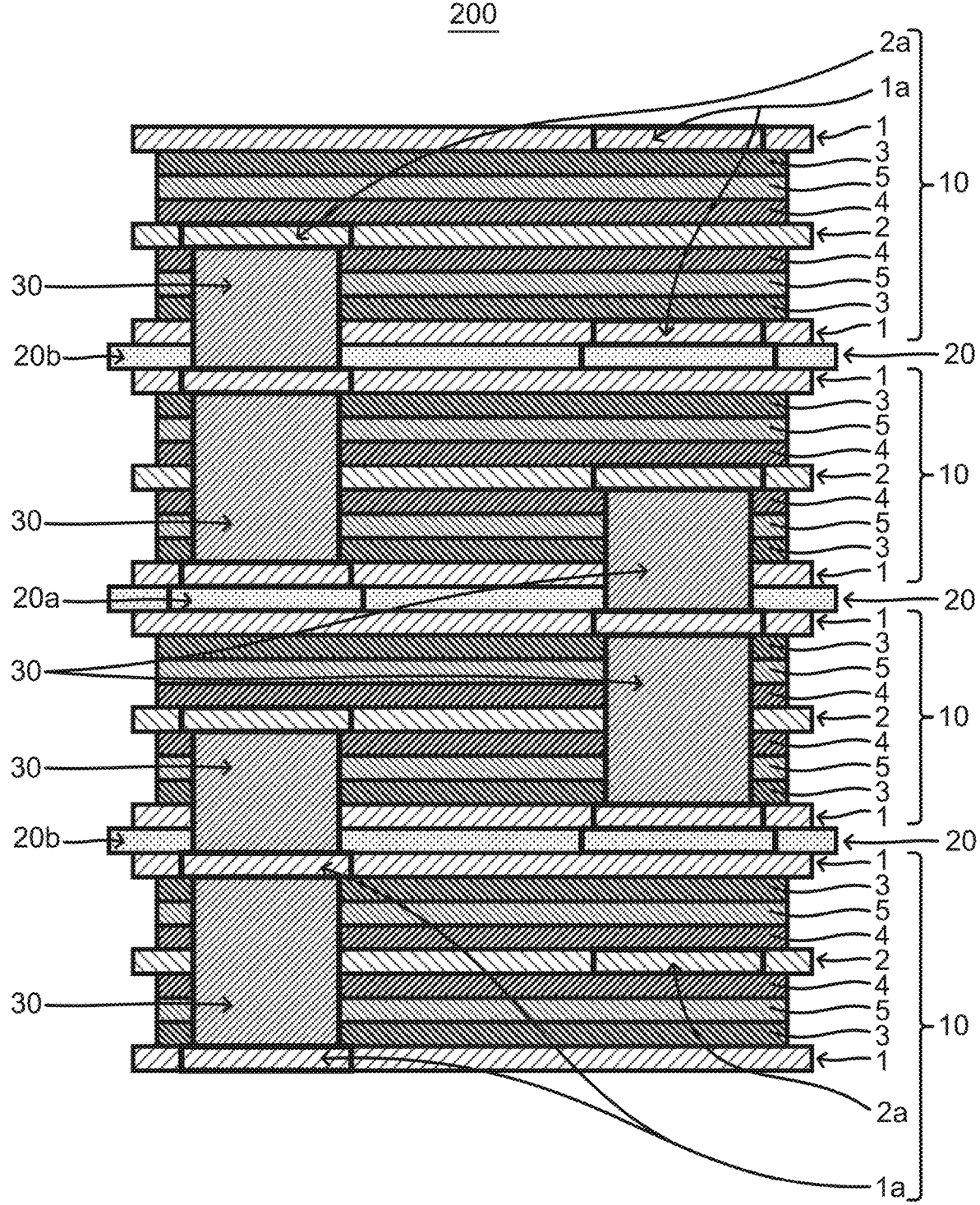
FIG. 8 is a schematic view detailing the structure of the battery according to the second embodiment.

FIGS. 7 and 8 show a battery 200 according to a second aspect. As shown in FIG. 7, in the battery 200, the connection part $1a$ of one electrode body 10 and the connection part $2a$ of another electrode body may be connected. In other words, one electrode body 10 and another electrode body 10 may be electrically connected in series via the conductive material. In this case, as shown in FIG. 7, one electrode body 10 and another electrode body 10 may be stacked in opposite directions to each other.

As shown in FIG. 8, like in the battery 100 described above, in the battery 200 according to the second aspect, the conductive material 30 is used to connect the connection parts to each other. The conductive material 30 is as described above. In the battery 200, the same effect as that in the battery 100 is obtained. For example, in the battery 200, since the surface roughnesses of the connection surfaces 1ax, 2ax of the metal current collectors 1, 2 are less than the surface roughnesses of the laminate surfaces 1bx, 2bx, the specific surface areas of the connection surfaces 1ax, 2ax are small, the amount of oxide film formed on the connection surfaces 1ax, 2ax can be suppressed, and the formed oxide film can be easily decreased. Thus, when the conductive material 30 is connected to the connection surfaces 1ax, 2ax, the contact resistance between the connection surfaces 1ax, 2ax and the conductive material 30 can be decreased. That is, the electrical connectivity between one electrode body 10 and another electrode body 10 is improved.

In the battery 200, a particularly high effect is exhibited when a melt-bonding type metal-based adhesive containing a low-melting point metal, such as solder, is used as the conductive material 30. Specifically, the wettability of metal-based adhesives on the connecting surfaces 1ax, 2ax, which have a small amount of oxide films, is remarkably improved, whereby the metal-based adhesive can firmly adhere to the connecting surfaces 1ax, 2ax, and the connectivity between one electrode body 10 and another electrode body 10 is remarkably improved. Furthermore, the conductive material 30 may contain solder, or may include solder and flux-derived components. Like the battery 100, the battery 200 also has a high effect of removing the oxide film with the flux, whereby solder can be firmly adhered to the connection surfaces 1ax, 2ax.

When electrode bodies 10 are connected in series, as in the battery 200, in many cases, the metal current collector 1 of one electrode body 10 and the metal current collector 2 of another electrode body 10 connected via the conductive material 30 are composed of different materials. In this case, by using solder as the conductive material 30, different metals can be more strongly bonded together.

As shown in FIGS. 7 and 8, when connecting the electrode bodies 10 with the conductive material 30, the electrode bodies 10 may be stacked while some sort of intermediate member is interposed between the electrode bodies 10. For example, the battery 200 may have an insulating body in a part between one electrode body 10 and another electrode body 10.

As shown in FIGS. 7 and 8, in the battery 200, when one of adjacent electrode bodies 10 interposing one insulating body 20 is defined as a first electrode body and the other electrode body 10 is defined as a second electrode body, the first electrode body and the second electrode body are connected in series with each other. For example, as shown by the double-headed arrow in FIG. 7, the tab 1a of the first electrode body (for example, the positive electrode tab) and the tab 2a of the second electrode body (for example, the negative electrode tab) are connected to each other, whereby the first electrode body and the second electrode body are connected in series. On the other hand, in the battery 200, as shown in FIGS. 7 and 8, an insulating tab 20a may be arranged between the tab 2a of the first electrode body (for example, the negative electrode tab) and the tab 1a of the second electrode body (for example, the positive electrode tab), whereby the tab 2a of the first electrode body and the tab 1a of the second electrode body may be insulated from each other.

In the battery 200, the number of electrode bodies 10 is not particularly limited. The number of electrode bodies may be appropriately determined in accordance with the target battery performance.

In addition to the structures described above, the battery 200 may comprise necessary terminals and a battery exterior body, such as laminated film. The structures thereof are obvious.

1.5 Effects

According to the battery (e.g., batteries 100, 200) of the present disclosure, since the surface roughnesses of the laminate surfaces 1bx, 2bx of the metal current collectors 1, 2 are comparatively high, due to the anchor effect, the adhesion of the active material layers 3, 4 to the laminate surfaces 1bx, 2bx can be maintained at a high level. Furthermore, according to the batteries 100, 200 of the present disclosure, since the surface roughnesses of the connection surfaces 1ax, 2ax of the metal current collectors 1, 2 are comparatively low, the oxide films on the connection surfaces 1ax, 2ax is easily decreased. Thus, physical and electrical connection of the conductive material 30 with the connection surfaces 1ax, 2ax becomes easy. As described above, according to the batteries 100, 200 of the present disclosure, both adhesion between the metal current collectors 1, 2 and the active material layers 3, 4 of the electrode bodies 10 and connectivity between the electrode bodies 10 (metal current collectors 1, 2) via the conductive material 30 can easily be achieved.

2. Battery Production Method

The technology of the present disclosure includes an aspect as a battery production method. As shown in FIGS. 1 to 8, the battery production method of the present disclosure comprises:

providing laminate surfaces 1bx, 2bx having comparatively high ten-point average roughnesses and connection surfaces 1ax, 2ax having comparatively low ten-point average roughnesses on surfaces of the metal current collectors 1, 2 (refer to FIG. 1), laminating the active material layers 3, 4 on the laminate surfaces 1bx, 2bx of the metal current collectors 1, 2 (refer to FIG. 1), using the metal current collector 1 on which the active material layer 4 is laminated to produce an electrode body 10 (refer to FIGS. 2A and B), preparing a plurality of the electrode bodies 10 (refer to FIG. 3), and connecting the connection surface 1ax and/or 2ax of one of electrode body 10 and the connection surface 1ax and/or 2ax of another electrode body 10 via the conductive material 30 (refer to FIGS. 3 and 4 or FIGS. 7 and 8). Each of the constituent elements is as described above.

The production method of the present disclosure may comprise subjecting the metal current collectors 1, 2 to a roughening process to form the laminate surfaces 1bx, 2bx having ten-point average roughnesses of more than 1 μm on a part of the metal current collectors 1, 2. Regarding the roughening process, refer to the foregoing.

Furthermore, the production method of the present disclosure may comprise subjecting the metal current collectors 1, 2 to a smoothing process to form the connection surfaces 1ax, 2ax having ten-point average roughnesses of 1 μm or less on a part of the metal current collector 1, 2. Regarding the details of the smoothing process, refer to the foregoing.

Furthermore, the production method of the present disclosure may comprise using solder and flux as the conductive material 30, decreasing the oxide films present on the connection surfaces 1ax, 2ax by the flux, and melting the solder to attach it to the connection surfaces 1ax, 2ax. The solder and the flux may be attached/adhered to the connecting surfaces 1ax, 2ax simultaneously, or the solder may be adhered after the flux has been attached.

Furthermore, in the production method of the present disclosure, the metal current collectors 1, 2 of one electrode body 10 and the metal current collectors 1, 2 of another electrode body 10, which are connected via the conductive material 30, may be composed of different materials. In this case, in particular, by using solder, different metals can be easily adhered to each other.

Furthermore, the production method of the present disclosure may comprise providing a tab on a part of the metal current collectors 1, 2, and the tab may have the connection surfaces 1ax, 2ax.

Furthermore, the production method of the present disclosure may comprise connecting one electrode body 10 and another electrode body 10 in series via the conductive material 30.

Further, the production method of the present disclosure may comprise arranging the insulating body 20 in a part between one electrode body 10 and another electrode body 10.

Figure 9:
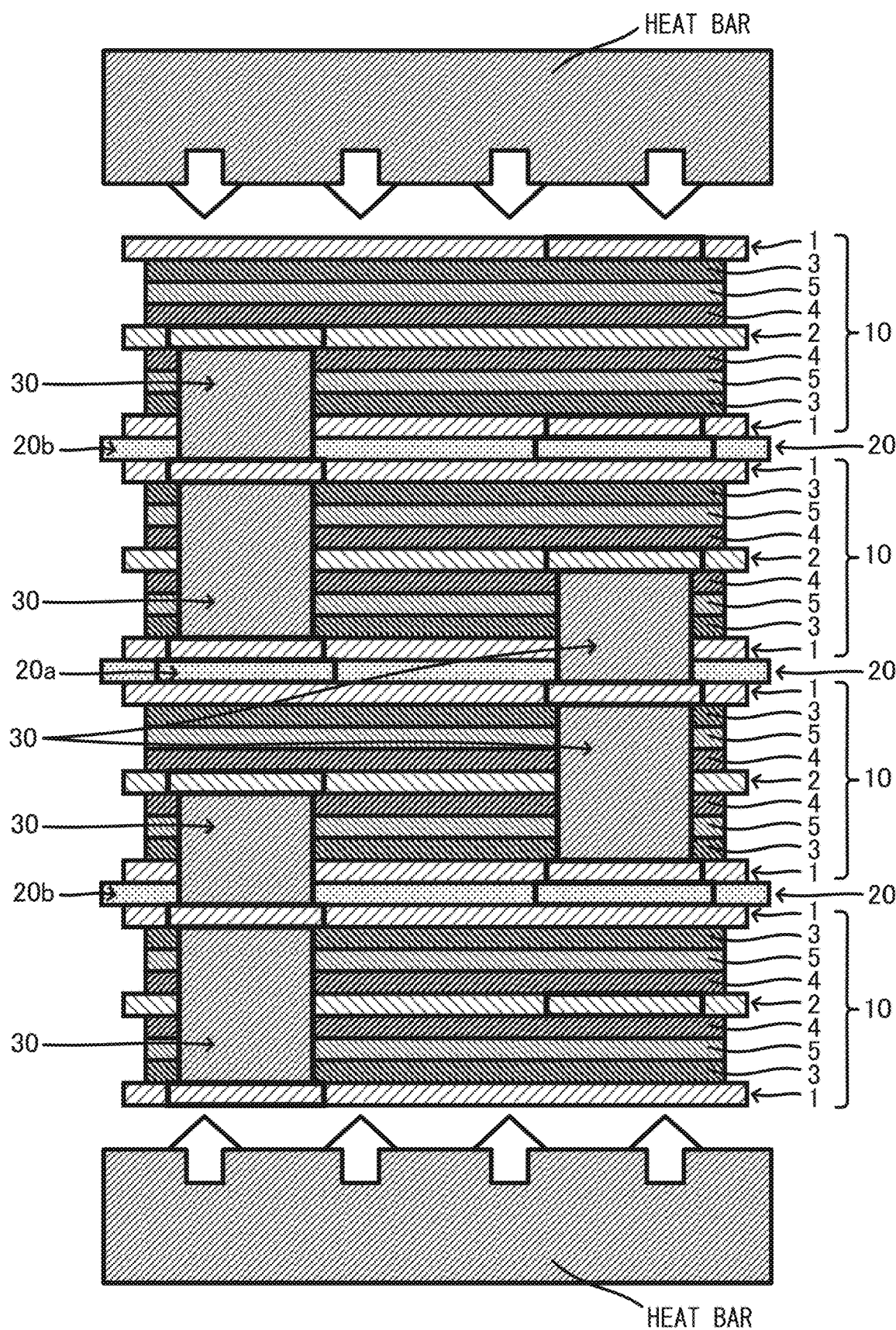
FIG. 9 is a schematic view detailing an example of heat-bonding after electrode body lamination.

For example, the battery 200 may be produced by the following production steps. First, a plurality of the above-mentioned electrode bodies 10 are prepared, a plurality of the above-mentioned insulating bodies 20 are prepared, and the electrode bodies 10 and the insulating bodies 20 are alternately stacked and arbitrarily pressed to obtain a laminated body. In the laminated body, the front and back directions of the one electrode body 10 (first electrode body) and the other electrode body 10 (second electrode body), which are adjacent to each other and which interpose one insulating body 20, are opposite to each other. In other words, the first electrode body and the second electrode body are laminated with the insulating body 20 so that the front and back sides are reversed. In the laminated bodies, the tabs may protrude in the same direction as the first electrode body and the second electrode body. The tabs are heat-bonded to each other on the laminated body obtained in this manner with solder. When heat-bonding is performed, it is preferable to heat at least the portion of the laminated body at which the tab is present from both sides in the stacking direction, and heat-bond the plurality of tabs protruding from the side surfaces of the laminated body simultaneously. For example, as shown in FIG. 9, heat bars are arranged on opposite end sides of the laminated body in the stacking direction, and the tab portions are heated from both ends in the stacking direction toward the center, whereby the plurality of tabs of the laminated body can be heat-bonded at once. Alternatively, tabs may be adhered to each other one by one with the conductive material 30.

As described above, according to the production method of the present disclosure, since the surface roughnesses of the laminate surfaces 1bx, 2bx of the metal current collectors are comparatively high, due to the anchor effect, the active material layers 3, 4 can be adhered to the laminate surfaces 1bx, 2bx. Furthermore, according to the production method of the present disclosure, since the surface roughnesses of the connection surfaces 1ax, 2ax of the metal current collectors 1, 2 are comparatively low, the oxide films on the connection surfaces 1ax, 2ax is easily decreased. Thus, physical and electrical connection of the conductive material 30 to the connection surfaces 1ax, 2ax is easy. As described above, according to the production method of the present disclosure, batteries 100, 200 which achieve both adhesion between the metal current collectors 1, 2 and the active material layers 3, 4 of the electrode body 10 and connectivity between electrode bodies 10 (between metal current collectors 1, 2) via the conductive material 30 can be produced.

EXAMPLES

A Ni foil was placed on a hot plate heated to 240° C., solder and flux were applied to the surface of the Ni foil, and the wettability of the solder on the Ni foil surface was evaluated. When the oxide film on the surface of the Ni foil was removed by the flux and the metal part of the Ni foil and the solder came into contact with each other, the solder dissolved in the Ni foil, and a reaction layer of a solid solution or an intermetallic compound was formed at the interface between the Ni foil and the solder, which was visually observed as the presence or absence of wettability.

As the Ni foil, one having a roughened surface or one having a smooth surface was used. The ten-point average roughness of the roughened surface was more than 1 μm (4 μm), and the ten-point average roughness of the smooth surface was 1 μm or less (0.9 μm).

Figure 10A:
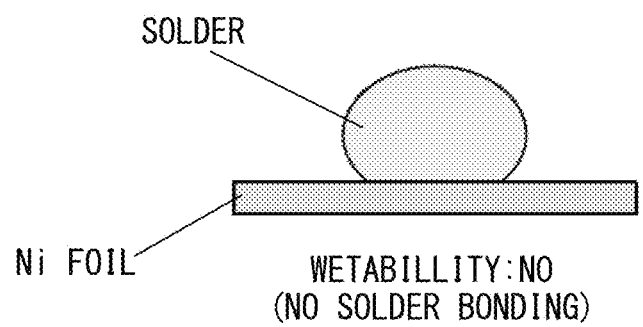
FIG. 10A is a schematic view detailing the wettability of solder on a roughened surface of a current collector.

As shown in FIG. 10A, even if solder and flux were applied to the roughened surface of the Ni foil, the solder did not spread wet, and it was difficult to make the solder adhere to the roughened surface of the Ni foil. Due to the large amount of oxide film present on the roughened surface and the difficulty of flux penetration on the roughened surface (refer to FIG. 5), it is likely that the oxide film on the roughened surface could not be sufficiently removed, whereby it is difficult to form a reaction layer of a solid solution or an intermetallic compound at the interface between the Ni foil and the solder.

Figure 10B:
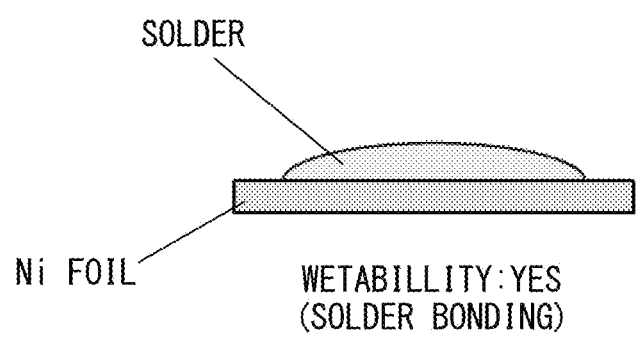
FIG. 10B is a schematic view detailing wettability of solder on a smoothed surface (smooth surface) of a current collector.

On the other hand, when solder and flux were applied to the smooth surface of Ni foil as shown in FIG. 10B, the solder spread widely, whereby the solder could strongly adhere to the smooth surface of the Ni foil. It is considered that since the smooth surface has less oxide film than the roughened surface, and the smooth surface makes it easier for the flux to contact the entire surface of the oxide film, the oxide film of the smooth surface could be sufficiently decreased, whereby a reaction layer of a solid solution or an intermetallic compound could be formed at the interface between the Ni foil and the solder.

The above results can be similarly obtained when a metal other than Ni is used. In the battery, when physical strong adhesion of the metal current collectors with solder is desired, decreasing the surface roughnesses of the connection surfaces of the metal current collectors is considered to be effective. Furthermore, the greater the surface roughnesses of the metal current collectors, the greater the amount of oxide films on the surfaces, and thus, from the viewpoint of electrical connectivity between the metal current collectors, decreasing the surface roughnesses is considered effective. On the other hand, when an active material layer is stacked on a metal current collector, in order to improve the adhesion between the current collector and the active material layer, increasing the surface roughness of the laminate surface contacting the active material layer, among the surfaces of the current collector, is considered effective. In light of these points, by making the ten-point average roughness of the connection surface of the metal current collector less than the ten-point average roughness of the laminate surface, both physical or electrical connectivity between current collectors via the conductive material and adhesion between the current collector and the active material layer can be achieved.

INDUSTRIAL APPLICABILITY

The battery of the present disclosure is suitable as, for example, a large power source mounted on an automobile.

REFERENCE SIGNS LIST 1, 2 metal current collector
1a, 2a connection part
1ax, 2ax connection surface
1b, 2b laminate part
1bx, 2bx laminate surface
3, 4 active material layer
5 electrolyte layer
10 electrode body
20 insulating body
20a insulating tab
20b electrode insulating part
30 conductive material
100, 200 battery

The invention claimed is:

1. A battery comprising a plurality of electrode bodies, wherein
one of the electrode bodies and another of the electrode bodies are connected via a conductive material,
each of the electrode bodies comprises a metal current collector, an active material layer, and an electrolyte layer,
the metal current collector has a connection surface which contacts the conductive material and a laminate surface which contacts the active material layer, and
a ten-point average roughness of the connection surface is less than a ten-point average roughness of the laminate surface.

2. The battery according to claim 1, wherein
the ten-point average roughness of the connection surface is 1 µm or less.

3. The battery according to claim 1, wherein
the conductive material includes solder.

4. The battery according to claim 3, wherein
the metal current collector of one of the electrode bodies and the metal current collector of another of the electrode bodies, which are connected via the conductive material, are composed of different materials.

5. The battery according to claim 1, wherein
the metal current collector comprises a tab, and
the tab has the connection surface.

6. The battery according to claim 1, wherein
one of the electrode bodies and another of the electrode bodies are connected in series via the conductive material.

7. The battery according to claim 1, wherein
an insulating body is included in a part between one of the electrode bodies and another of the electrode bodies.

8. A battery production method, comprising:
providing a laminate surface having a comparatively high ten-point average roughness and a connection surface having a comparatively low ten-point average roughness on a surface of a metal current collector,
laminating an active material layer on the laminate surface of the metal current collector,
using the metal current collector on which the active material layer is laminated to produce an electrode body,
preparing a plurality of the electrode bodies, and
connecting the connection surface of one of the electrode bodies and the connection surface of another of the electrode bodies via a conductive material.

9. The production method according to claim 8, comprising:
subjecting the metal current collector to a roughening process to form the laminate surface having a ten-point average roughness of more than 1 µm on a part of the metal current collector.

10. The production method according to claim 8, comprising:
subjecting the metal current collector to a smoothing process to form the connection surface having a ten-point average roughness of 1 µm or less on a part of the metal current collector.

11. The production method according to claim 8, comprising:
using solder and flux as the conductive material,
decreasing an oxide film present on the connection surface by the flux, and
melting the solder to adhere it to the connection surface.

12. The production method according to claim 11, wherein
the metal current collector of one of the electrode bodies and the metal current collector of another of the electrode bodies, which are connected via the conductive material, are composed of different materials.

13. The production method according to claim 8, comprising:
providing a tab on a part of the metal current collector, wherein
the tab has the connection surface.

14. The production method according to claim 8, comprising:
connecting one of the electrode bodies and another of the electrode bodies in series via the conductive material.

15. The production method according to claim 8, comprising:
arranging an insulating body in a part between one of the electrode bodies and another of the electrode bodies.

* * * * *